United States Patent
Cruz (10) Patent No.: US 10,948,310 B2
(45) Date of Patent: Mar. 16, 2021

(54) LOCATION-BASED IN-VEHICLE RESTAURANT MENU

(71) Applicant: DISH Network L.L.C., Englewood, CO (US)

(72) Inventor: Alan Cruz, Aurora, CO (US)

(73) Assignee: DISH Network L.L.C., Englewood, CO (US)

( * ) Notice: Subject to any disclaimer, the term of this patent is extended or adjusted under 35 U.S.C. 154(b) by 162 days.

(21) Appl. No.: 16/215,555

(22) Filed: Dec. 10, 2018

(65) Prior Publication Data

US 2020/0182652 A1 Jun. 11, 2020

(51) Int. Cl.
| | | |
|---|---|---|
| G01C 21/36 | (2006.01) | |
| H04W 4/44 | (2018.01) | |
| G06Q 50/12 | (2012.01) | |
| H04W 4/021 | (2018.01) | |

(52) U.S. Cl.
CPC ......... *G01C 21/3697* (2013.01); *G06Q 50/12* (2013.01); *H04W 4/021* (2013.01); *H04W 4/44* (2018.02)

(58) Field of Classification Search
CPC ..... H04W 4/021; H04W 4/0254; H04W 4/48; H04W 4/025; H04W 4/44; H04W 4/02; H04W 4/40; G01C 21/3697; G06Q 50/12
USPC ..................................................... 705/32, 15
See application file for complete search history.

(56) References Cited

U.S. PATENT DOCUMENTS

| | | | | |
|---|---|---|---|---|
| 6,584,403 | B2* | 6/2003 | Bunn | G07B 15/00 340/988 |
| 6,892,116 | B2* | 5/2005 | Geisler | B60R 16/0231 701/1 |
| 7,167,711 | B1* | 1/2007 | Dennis | G06Q 20/04 235/382 |
| 8,348,154 | B2* | 1/2013 | Sims | G06Q 20/20 235/380 |
| 8,868,023 | B2* | 10/2014 | Ellis | G06F 1/324 455/343.1 |
| 9,020,848 | B1* | 4/2015 | Ridge | G07C 1/10 705/32 |

(Continued)

OTHER PUBLICATIONS

Brandon, John, "Yes, you can buy a donut and coffee with the Chevy Equinox," TechRadar, Retrieved from https://www.techradar.com/news/yes-you-can-buy-a-donut-and-coffee-with-the-chevy-equinox, Accessed on Oct. 16, 2018, 12 pages.

(Continued)

*Primary Examiner* — Andrew Joseph Rudy
(74) *Attorney, Agent, or Firm* — Kilpatrick Townsend & Stockton LLP (57) ABSTRACT

Various arrangements of location-based in-vehicle restaurant menu systems are presented. In some embodiments, a location sensor that determines a global location of a vehicle is present. An in-vehicle display incorporated as part of the vehicle may be present. A location of the vehicle may be determined to correspond to a location-specific menu based on data received from the location sensor. A location-specific menu may be retrieved for the available restaurant location in response to determining the location of the vehicle. The location-specific menu may be output for presentation to the in-vehicle display, allowing a user to decide on his order before approaching an intercom system.

13 Claims, 6 Drawing Sheets

(56) References Cited

U.S. PATENT DOCUMENTS

| | | | | |
|---|---|---|---|---|
| 9,031,845 B2* | 5/2015 | Kennewick | ......... | G06F 16/3329 |
| | | | | 704/270 |
| 9,495,957 B2* | 11/2016 | Weider | ................ | G10L 15/1815 |
| 10,251,128 B2* | 4/2019 | Nguyen | ................... | H04W 4/90 |
| 10,424,201 B2* | 9/2019 | Roelle | ................... | B60W 50/14 |
| 2002/0152264 A1* | 10/2002 | Yamasaki | ............. | H04L 67/306 |
| | | | | 709/203 |
| 2005/0171850 A1* | 8/2005 | Yueh | ...................... | G06Q 30/06 |
| | | | | 705/15 |
| 2005/0215194 A1* | 9/2005 | Boling | ................... | H04H 20/57 |
| | | | | 455/3.02 |
| 2015/0011173 A1* | 1/2015 | Ellis | ...................... | H04H 60/35 |
| | | | | 455/343.5 |

OTHER PUBLICATIONS

Chevy Marketplace, Retrieved from https://my.chevrolet.com/learnAbout/marketplace, Accessed on Oct. 15, 2018, 6 pages.

* cited by examiner

LOCATION-BASED IN-VEHICLE RESTAURANT MENU

BACKGROUND

Ordering food and drink items using a drive-through can be a slow and frustrating process, both for customers and restaurants. Typically, customers remain within their vehicles in a queue until approaching a menu display and bidirectional intercom system. Until approaching the menu display, it may not be possible for customers to be aware of the exact items available for purchase at the location and the prices at which such items are offered. Further, while some items may be standardized across multiple restaurant locations, limited-time offers and available promotions may vary from location to location.

When a customer approaches the menu display, the customer may need several minutes to review the menu display and make a final decision on what items that the customer wishes to purchase. This delay at the menu display may result in a frustrating time delay for other customers who are behind the currently-ordering customer in the vehicular queue. Further, this delay may cause a lower customer throughput than would be possible if the customers were able to provide their orders in a more timely fashion.

SUMMARY

Various arrangements are presented for providing location-based in-vehicle restaurant menus. A location sensor may be present that determines a global location of a vehicle. An in-vehicle display may be present that is part of the vehicle. One or more processors that are in communication with the in-vehicle display and the location sensor may be present. A location of the vehicle may be determined, based on data received from the location sensor, to correspond to an available restaurant location. A location-specific menu may be received for an available restaurant location in response to determining the location of the vehicle corresponds to the available restaurant location. The location-specific menu may be output for presentation to the in-vehicle display.

Embodiments of such arrangements may include one or more of the following features: Input selecting a menu application may be received. The location of the vehicle may be determined in response to the received input selecting the menu application. Determining that the location of the vehicle corresponds to the available restaurant location may include determining the location of the vehicle is within a predefined threshold distance of the available restaurant location. While outputting for presentation the location-specific menu, a determination may be made that the location of the vehicle has moved outside of a second predefined threshold distance of the available restaurant location. The location-specific menu may cease being output for presentation via the in-vehicle display in response to determining the location of the vehicle has moved outside of the second predefined threshold distance of the available restaurant location. An antenna may be used to receive data for the location-specific menu via a digital radio transmission received via the antenna. A tuner may be used to tune to a predefined frequency to receive the digital radio transmission. A plurality of location-specific menus may be received via the digital radio transmission. The plurality of location-specific menus may be stored to the non-transitory processor-readable storage medium.

DETAILED DESCRIPTION

Providing customers with easy access to a menu that accurately reflects product availability and pricing at a particular restaurant location may benefit customers and restaurants. Such a menu may be provided via an in-vehicle display. An application may be executed by an in-vehicle system that can determine the vehicle's location. Based on the location, it may be possible to determine a restaurant at which the customer is interested in making a purchase. Accurate menus may be obtained in various ways. In some embodiments, via a network connection, the in-vehicle system may request the particular menu needed from a remote server system. Alternatively, multiple menus may be downloaded by the in-vehicle system based on the vehicle's geographic location.

In other embodiments, digital radio broadcasts may be used to provide the menu to the in-vehicle system. In some embodiments, on a predefined frequency, a low-power transmitter located at the restaurant may broadcast menu information that is received via a tuner in communication with the in-vehicle system. Alternatively or additionally, a digital radio transmitter, operating on a predefined frequency, may transmit menu information for multiple restaurants. Such menu information may be received by the in-vehicle system and stored for the future possibility that viewing of the menu is desired by a customer via the in-vehicle system.

Figure 1:
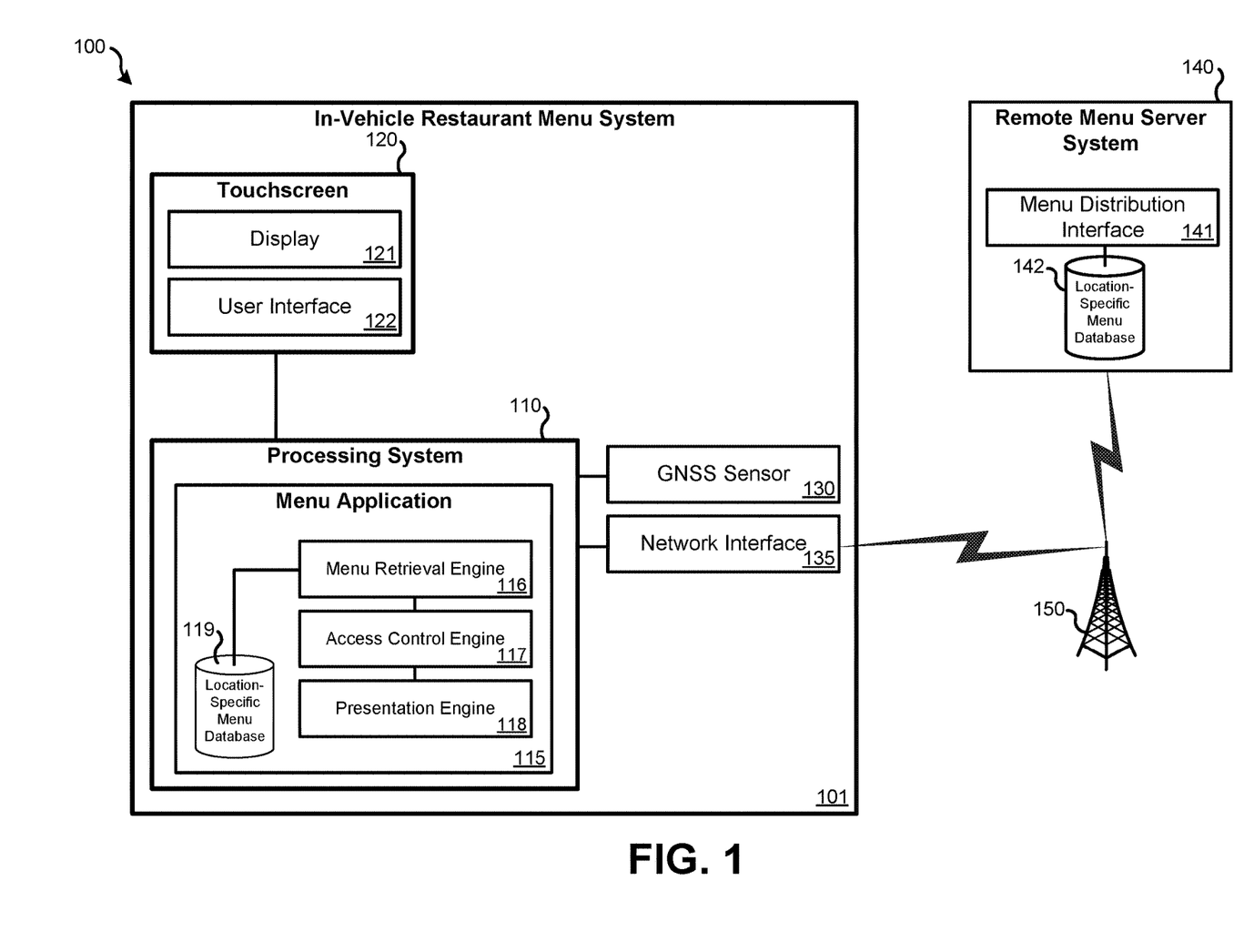
FIG. 1 illustrates an embodiment of a location-based in-vehicle restaurant menu system.

Further detail in regard to such embodiments and additional embodiments is provided in relation to the figures. FIG. 1 illustrates an embodiment of a location-based restaurant menu system 100. System 100 may include: in-vehicle restaurant menu system 101; cellular network 150 and remote menu server system 140. In-vehicle restaurant menu system 101 may include: processing system 110; touchscreen 120; global navigation satellite system (GNSS) sensor 130; and network interface 135.

In-vehicle restaurant menu system 101 may be permanently installed as part of a vehicle. In-vehicle restaurant menu system 101 can incorporate components that are shared with a vehicle's entertainment or navigation system. In some embodiments, touchscreen 120 may be present. Touchscreen 120 may combine display 121 and user interface 122. By a user touching locations on display 121, user interface 122 may provide processing system 110 with an indication of location on display 121 which can be interpreted to determine the displayed element that the user is attempting to select. In other embodiments, rather than touchscreen 120 being present, display 121 may be present, but may not be incorporated as part of a touchscreen. A user may use a separate user interface 122, which may consist of buttons, dials, a touchpad, and/or some other form of user input device to indicate what item has been selected on display 121.

GNSS sensor 130 may be a sensor device that determines a global position of the vehicle in which GNSS sensor 130 is installed. GNSS sensor 130 may use one or more satellite systems to determine the vehicle's location. For example, GPS, Galileo, BeiDou, and/or GLONASS satellite navigation systems may be used to determine the vehicle's location. Network interface 135 may allow in-vehicle restaurant menu system 101 to communicate via a cellular network. Network interface 135 may use 3G, 4G, LTE, 5G, or some other form of cellular communication standard to communicate with cellular network 150. By communicating with cellular network 150, the Internet and/or a private network may be accessed. Via the Internet, network interface 135 may be able to communicate with remote menu server system 140.

Processing system 110 may include one or more processors that access one or more non-transitory processor-readable mediums. Processing system 110 may communicate with touchscreen 120, display 121, user interface 122, GNSS sensor 130, and/or network interface 135. Processing system 110 may include one or more special-purpose processors that are designed to perform the functions of menu application 115. Alternatively, processing system 110 may use one or more general purpose processors that are configured to execute stored firmware or software. Menu application 115 may be software that can be downloaded and installed on a non-transitory processor-readable medium of in-vehicle restaurant menu system 101. Menu application 115 may include: menu retrieval engine 116; access control engine 117; presentation engine 118; and location-specific menu database 119. Menu retrieval engine 116, access control engine 117, and presentation engine 118 represent components that may be performed by a single piece or multiple pieces of software executed by processing system 115 as part of menu application 115. It should be understood that these components may be subdivided into additional components or combined into fewer components.

Menu retrieval engine 116 may receive location information from GNSS sensor 130. Based on the received location information, menu retrieval engine 116 may access location-specific menu database 119 to determine if a locally-stored menu is present that is: 1) up-to-date; and 2) corresponds to the location indicated by GNSS sensor 130. To determine whether the locally-stored location-specific menu is up-to-date, a difference between a timestamp of the menu and the current date/time may be compared with a stored threshold time duration. For example, if the menu is less than a week old, it may be considered up-to-date. To determine if the locally-stored location-specific menu corresponds to the location of the vehicle, a location may be stored that is mapped to the location-specific menu in location-specific menu database 119. For instance, if the current location of the vehicle is within a threshold distance (e.g., 500 feet) of the location linked to the location-specific menu, it may be determined that the menu is eligible to be presented.

Menu retrieval engine 116, in alternate to accessing location-specific menu database 119, or if no corresponding menu is located in location-specific menu database 119, may cause an indication of the vehicle's location to be transmitted to remote menu server system 140 via network interface 135. Remote menu server system 140 may include one or more computer systems that can be accessed via a cellular network directly or via the Internet. Remote menu server system 140 may include menu distribution interface 141, which may be implemented using software stored using a non-transitory processor-readable medium and executed by one or more processors. Menu distribution interface 141 may access location-specific menu database 142 to identify one or more location-specific menus that correspond to the location of the vehicle as indicated in the message received network interface 135. A location-specific menu can correspond to a particular location of a restaurant. For example, a chain fast-food restaurant may have many locations with similar menus, but prices and availability of special offers may vary slightly by location. Therefore, an accurate location-specific menu may be maintained. Such location-specific menus may be transmitted to network interface 135 in a response message via the cellular network. In some embodiments, in response to receiving a location of a vehicle, all location-specific menus within a define distance of the vehicle may be provided and stored using location-specific menu database 119. In still other embodiments, menu retrieval engine 116 may track the locations where the vehicle is frequently located (e.g., at home, at work). Location-specific menus for restaurants within a predefined distance of where the vehicle is frequently located may be acquired from remote menu server system 140 and stored locally using location-specific menu database 119.

Administrators for restaurants may be permitted to upload up-to-date menus for restaurant locations to location-specific menu database 142. The administrator may be required to provide a location of the restaurant by providing an address or location on a map) and uploading the location-specific menu in a particular file format. The administrator may be required to indication a date through which the location-specific menu is valid or may be required to periodically certify that the location-specific menu is up-to-date.

Access control engine 117 may monitor whether the vehicle is moving above a defined threshold speed. If so, presentation engine 118 may be triggered to cease presenting a location-specific menu or block user interactions with the location-specific menu. When the vehicle slows to below the threshold speed (which may require the vehicle coming to a complete stop), presentation or interaction with the location-specific menu may be resumed. Access control engine 117 may receive speed readings from another vehicle system or may use location measurements from GNSS sensor 130 to determine if the vehicle is moving and at what speed.

Presentation engine 118 may receive data from menu retrieval engine 116 and may format the data appropriately for presentation as a menu, which may be interactive, for output to display 121. Presentation engine 118 may add advertisement, graphics, and/or interactive elements (e.g., selectable menu subcategories) to the output version of the location-specific menu. In some embodiments, while the location-specific menu is being presented, menu retrieval engine 116 may continue to monitor the location of the vehicle. If the vehicle moves outside of a threshold distance from the location mapped to the location-specific menu, the location-specific menu may cease being presented. That is, if the vehicle is moving away from the restaurant, it can be inferred that the user either already ordered food or decided not to order from the restaurant.

Figure 2:
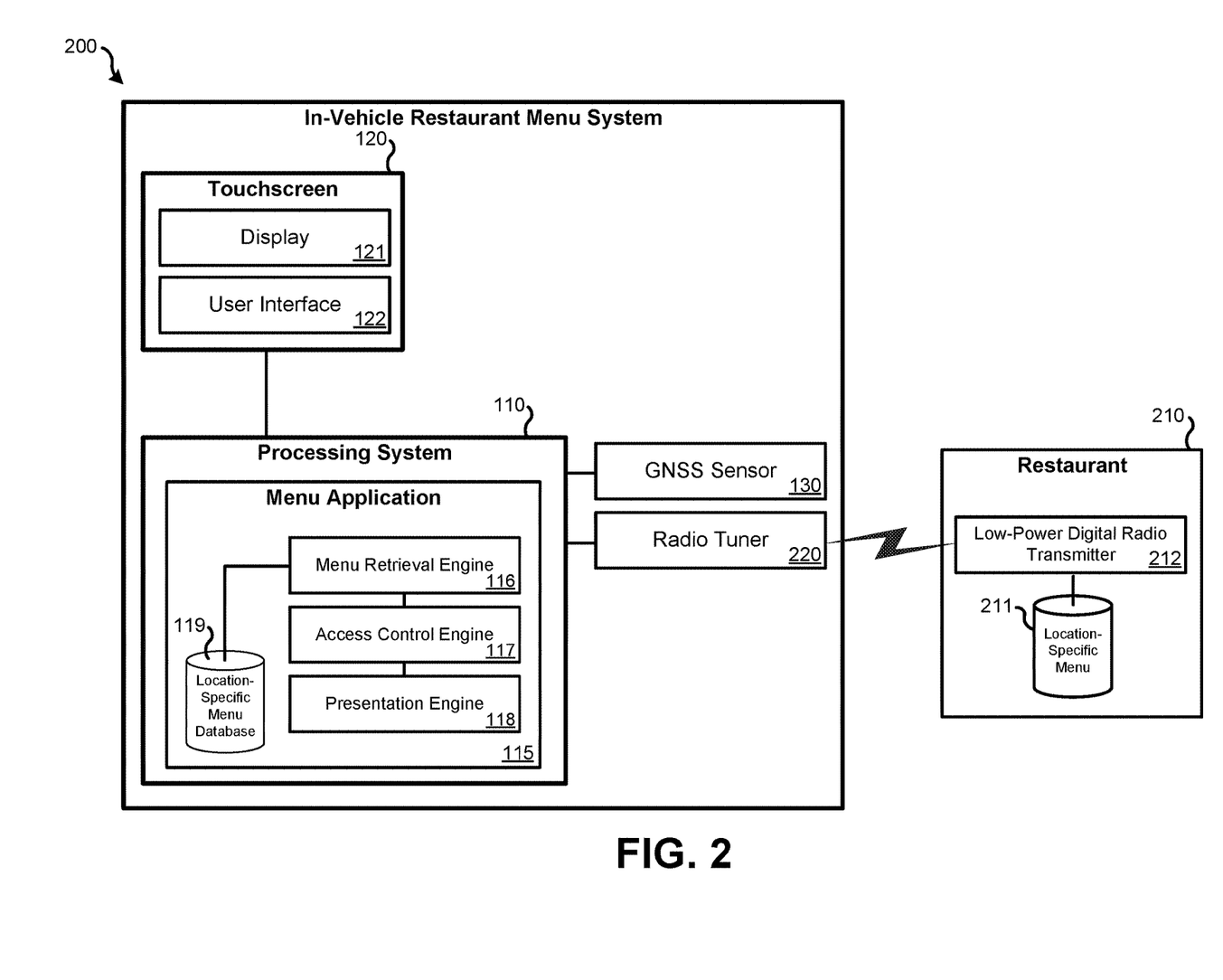
FIG. 2 illustrates another embodiment of a location-based in-vehicle restaurant menu system.

FIG. 2 illustrates an embodiment of a location-based restaurant menu system 200. In system 200, rather than using a network to communicate with a remote server to obtain location-specific menus, system 200 uses a radio tuner to receive low-power digital radio broadcasts. Restaurant 210 may have a low-power digital radio transmitter 212 that broadcasts on a predefined frequency at a low power level (compared to a radio station), thus allowing reception of the digital radio signal using standard vehicle equipment within a short distance, such as 500 feet. Location-specific menu 211 may be repeatedly transmitted via low-power digital radio transmitter 212, such that radio tuners in the region, if tuned to the correct frequency, can receive the location-specific menu in a short period of time.

Radio tuner 220 may be controlled by menu application 155 when menu application 155 is being executed. Radio tuner 220 may be caused to tune to a particular frequency that has been designated for receiving menu broadcasts. Data may be received via radio tuner 220 on the designated frequency when a local low-power digital radio transmitter, such as low-power digital radio transmitter 212 is within range. Menu retrieval engine 116 may receive the data from radio tuner 220 and construct a location-specific menu for presentation. Receive location-specific menus may be stored to location-specific menu database 119, timestamped, and possibly, a location of the vehicle logged. If the vehicle moves within a predefined distance of the restaurant again (as determined using GNSS sensor 130 measurements), the location-specific menu may be retrieved from location-specific menu database 119.

In an alternative embodiment, rather than low-power digital radio transmitter 212 being used, a higher-power digital radio transmitter may be used for all restaurants in a given region. For example, a digital radio transmitter may have a range of twenty miles. Such a digital radio transmitter may transmit location-specific menus for many restaurants within that geographic region. Such location-specific menus may be received by radio tuner 220 and stored to location-specific menu database 119. Based on the location of the vehicle determined based on measurements from GNSS sensor 130, the appropriate location-specific menu may be retrieved. In some embodiments, only some location-specific menus received via radio tuner 220 may be stored to location-specific menu database 119. For example, only location-specific menus that are within a predefined distance of locations where the vehicle is typically located (e.g., work, home) may be stored to location-specific menu database 119. Alternatively, a user may provide a preference of types of food or specific chains of restaurants that the user prefers. A location-specific menu may only be stored if it matches the user's defined preferences.

Figure 3:
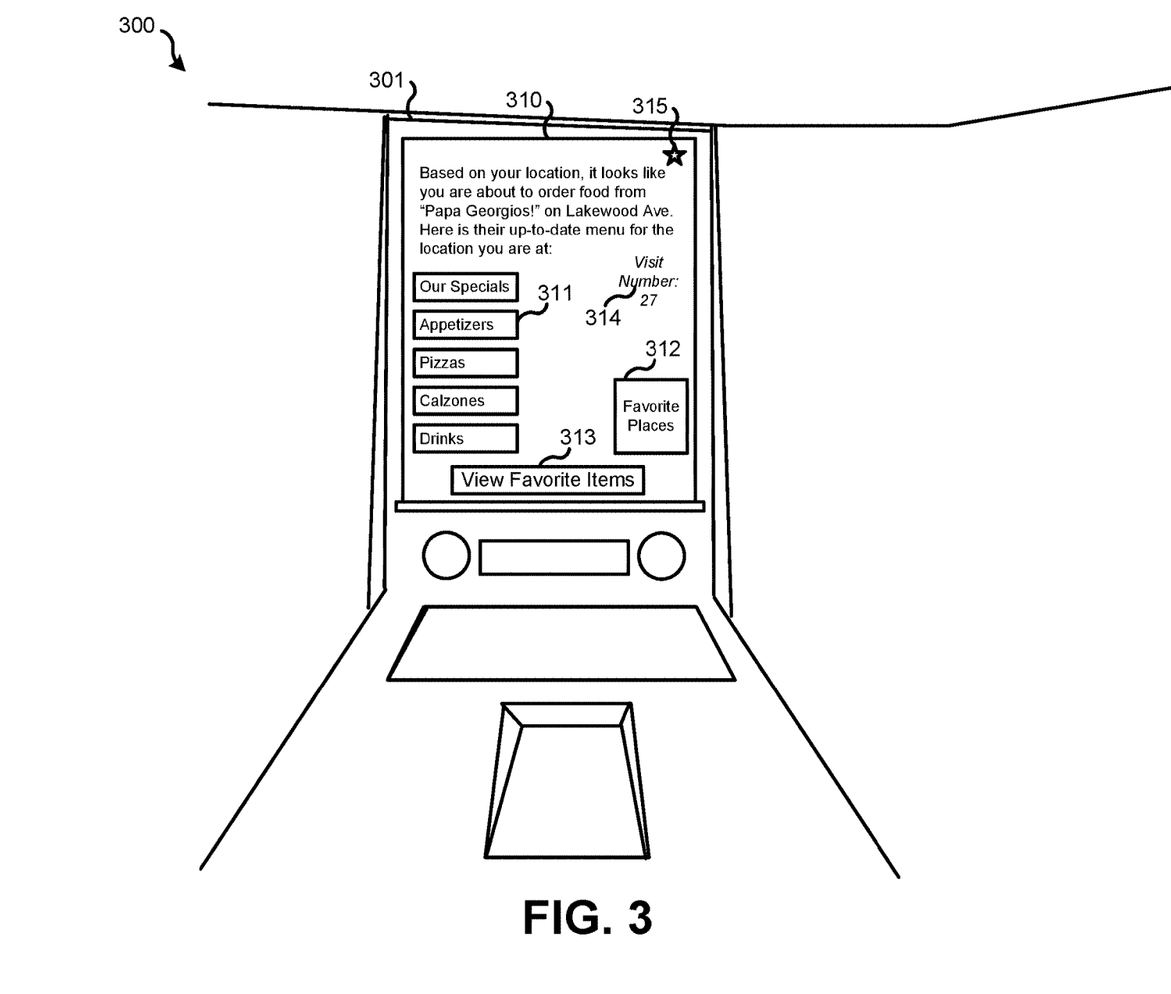
FIG. 3 illustrates an embodiment of a user interface presented by an in-vehicle restaurant menu system.

FIG. 3 illustrates an embodiment 300 of a user interface presented by an in-vehicle restaurant menu system. In embodiment 300, the vehicle in which in-vehicle restaurant menu system 301 is installed may be determined to be within a threshold distance of a restaurant. By way of example only, the restaurant is called "Papa Georgios!". The location-specific menu may be retrieved according to the arrangements detailed in relation to FIG. 1 or 2. In embodiment 300, the location-specific menu is interactive and may be presented as interface 310. That is, there are graphical elements which a user may select to display additional menu information. For example, if a user wishes to learn about appetizers available at this location of "Papa Georgios!" he could select graphical element 311.

Figure 4:
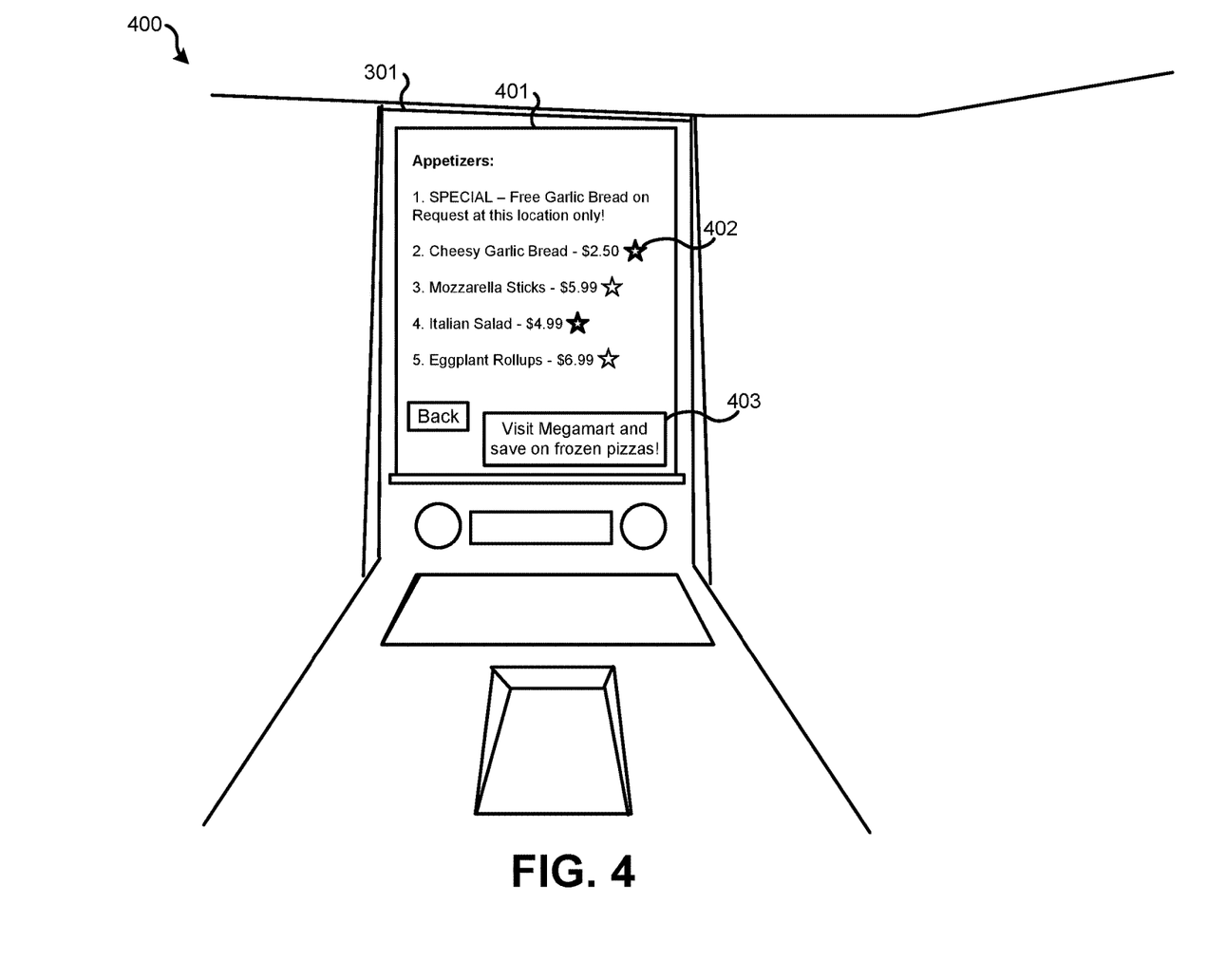
FIG. 4 illustrates an embodiment of a user interface presented by an in-vehicle restaurant menu system.

Interface 310 may include additional elements which are selectable or viewable by a user. A user may select favorite places element 312 to view restaurants that have been indicated as a favorite of a user, such as by clicking star element 315 when the restaurant's menu is presented. Selection of favorite items element 313 may list items at the restaurant for which a menu is currently being presented that a user has designated as a favorite, such as by selecting a favorite element for such items as illustrated in FIG. 4. Additionally, counter 314 may be present that indicates the number of times a person has frequented a restaurant. The counter may be based on the vehicle having been within a threshold distance of the restaurant for at least a threshold period of time. For instance, such proximity and time may be indicative of the user having stopped at the restaurant to pick up food or dine in. The counter may be used to populate favorite places 312 based on which restaurants are visited the most often.

Following selection of graphical element 311, interface 401 may be presented. FIG. 4 illustrates an embodiment 400 of an interface 401 presented by in-vehicle restaurant menu system 301. Interface 401 illustrates how after selection of graphical element 311, prices for appetizers are presented that are accurate for the specific restaurant location. Further, a special is indicated that is particular to the location of the restaurant. Star element 402 may be indicative that a user has flagged menu item two as being one of his favorites. Such a designation may result in it being presented as part of a favorite items list available for that restaurant.

In some embodiments, advertisements may be retrieved by the in-vehicle restaurant menu system and presented as banners, such as banner 403, while concurrently presenting a menu. The advertisements may be for other local restaurants or other businesses, which may be located within a threshold distance. By virtue of the user being known to be visiting a particular restaurant, the user may be a good target for some other businesses' products or services. For instance, if a user tends to buy food at a pizza chain restaurant, he may be more likely to also buy frozen pizzas from a supermarket.

Figure 5:
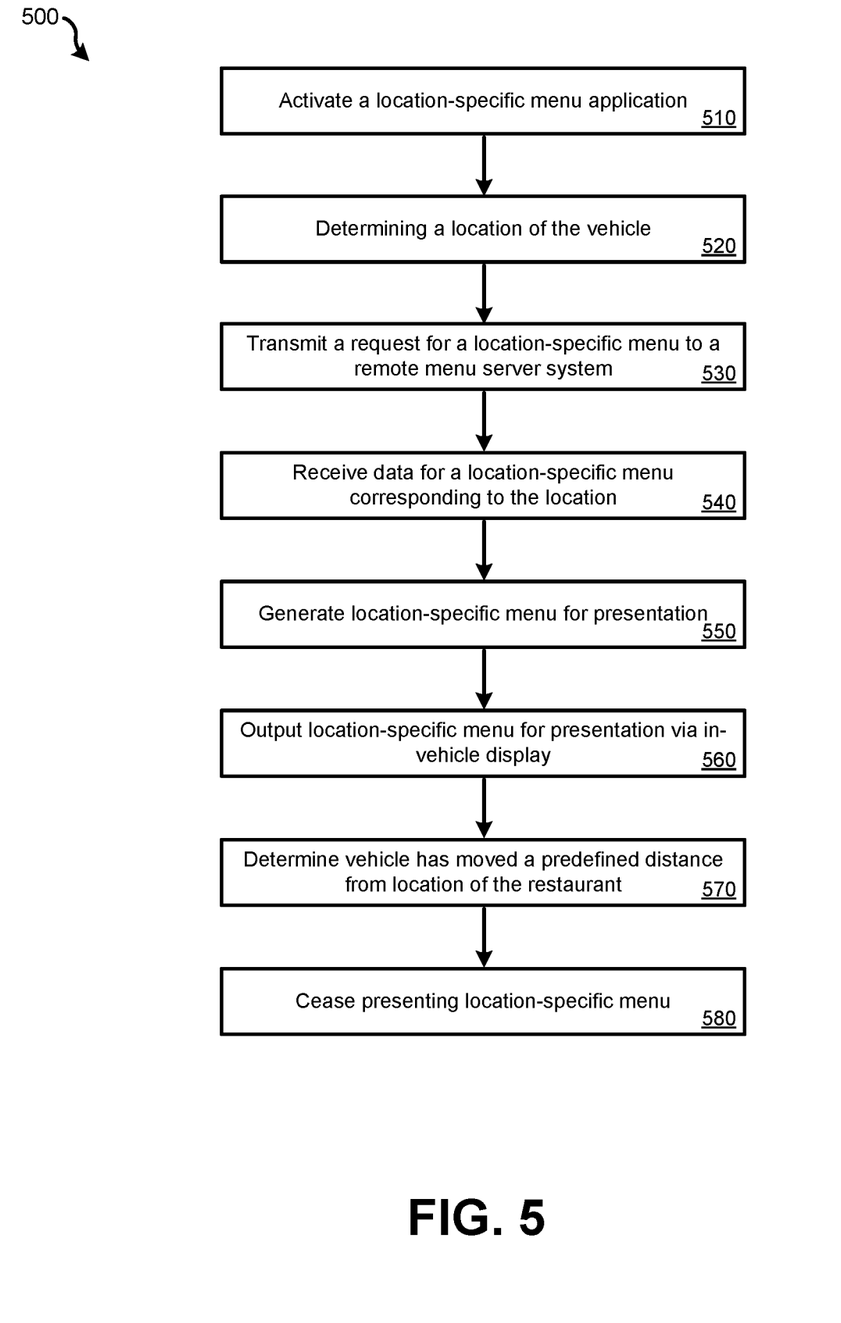
FIG. 5 illustrates an embodiment of a method for providing an in-vehicle restaurant menu by accessing a remote menu server system.

Various methods may be performed using the systems and interfaces detailed in relations to FIGS. 1-4. FIG. 5 illustrates an embodiment of a method 500 for providing an in-vehicle restaurant menu by accessing a remote menu server system. Each step of method 500 may be performed by in-vehicle restaurant menu system 101.

At block 510, a location-specific menu application may be activated. This may involve a user selecting an application for executing on a vehicle's entertainment and/or navigation system. In other embodiments, the location-specific menu application may be executed without a user request based on a location of the vehicle. At block 520, a location of the vehicle may be determined. The location may be determined using a GNSS sensor or some other form of absolute location determination.

At block 530, a request for a location-specific menu may be transmitted to a remote server via a wireless communication link. This wireless communication link may use a Wi-Fi connection, a cellular communication network, Bluetooth®, or some other wireless communication arrangement. The request may indicate a location of the vehicle. Alternatively, if a database is stored locally by the vehicle of restaurant locations for which location-specific menus are available, the request may indicate a particular location-specific menu to be retrieved. In response, at block 540, data for the location-specific menu may be received by the in-vehicle restaurant menu system.

At block 550, the in-vehicle restaurant menu system may use the received data to construct a location-specific menu for presentation. This may include formatting graphics, creating sub-menus, and formatting the received data to be correctly presented on a display of the vehicle. At block 560, the location-specific menu may be output for presentation via the display touchscreen) of the vehicle. If the vehicle's speed exceeds a threshold (which may be any movement at all), user interaction with the menu may be prevented.

At block 570, the location of the vehicle may be continued to be monitored. It may be determined if the vehicle has moved at least a threshold distance away from a location mapped to the location-specific menu. If not, the location-specific menu may continue to be presented. If the vehicle has moved more than the threshold distance away from the location mapped to the location specific menu, the location-menu may cease being presented at block 580.

If the user so desires, the order for food to the restaurant may be placed via an online ordering application that may be installed on the user's mobile device. In some embodiments, a similar application may be executed on the in-vehicle system which allows a user to order and, possibly, pay for his order. Alternatively, a user can call the restaurant and place his order based on reviewing the location-specific menu.

Figure 6:
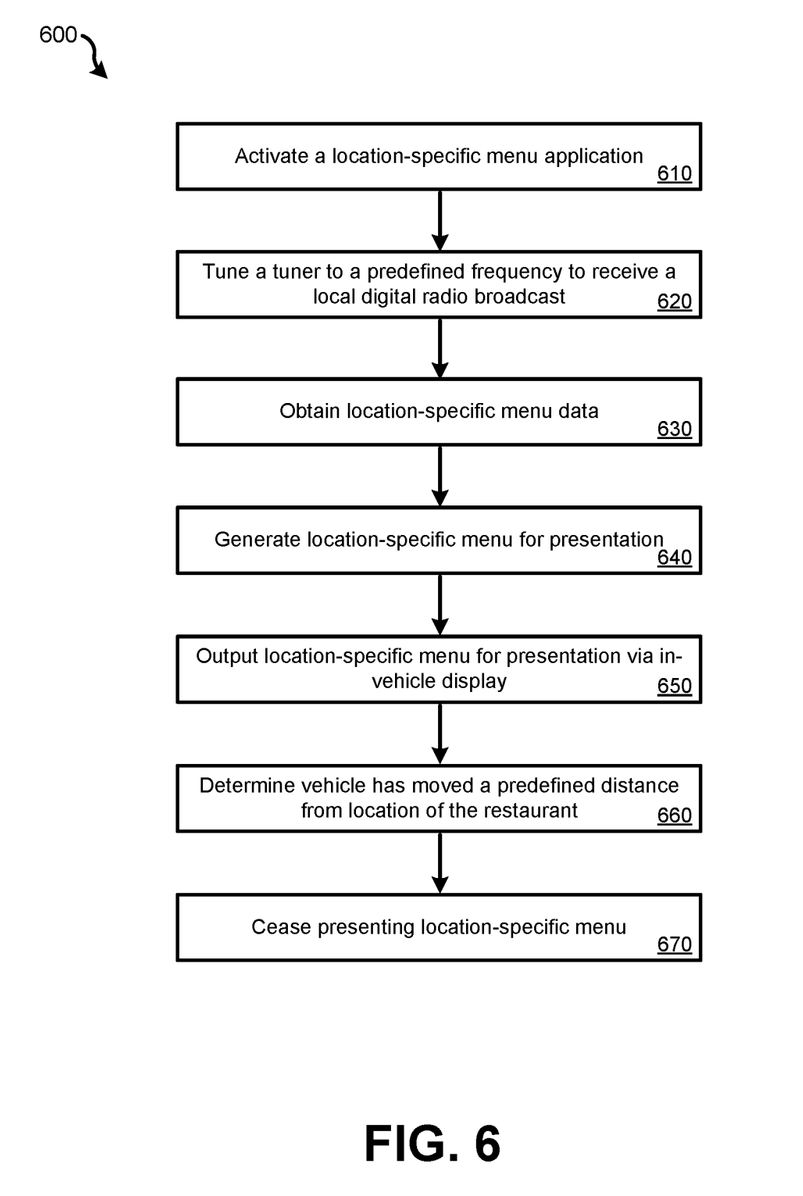
FIG. 6 illustrates an embodiment of a method for providing an in-vehicle restaurant menu based on a digital radio broadcast.

FIG. 6 illustrates an embodiment of a method 600 for providing an in-vehicle restaurant menu based on a digital radio broadcast. Each step of method 600 may be performed using system 200 of FIG. 2. At block 610, a location-specific menu application may be activated. This may involve a user selecting an application for executing on a vehicle's entertainment and/or navigation system. In other embodiments, the location-specific menu application may be executed without a user request based on a location of the vehicle. At block 620, a tuner of a radio system of the vehicle may be tuned to a predefined frequency in an attempt to receive a digital radio transmission of data. If a low-power radio transmitter is used to transmit the data for the location-specific menu, it may be expected that data may only be received if the vehicle is close to a particular restaurant. A tuner that is typically used for receiving radio stations may be used for block 620, therefore the ability of music or sound a radio station to be output may be suspended while the tuner is being used to receive the data for the location-specific menu.

At block 630, data for the location-specific menu may be received by the in-vehicle restaurant menu system via the tuner. At block 640, the in-vehicle restaurant menu system may use the received data obtained via the tuner to construct a location-specific menu for presentation. This may include formatting graphics, creating sub-menus, and formatting the received data to be correctly presented on a display of the vehicle. At block 650, the location-specific menu may be output for presentation via the display (e.g., touchscreen) of the vehicle. If the vehicle's speed exceeds a threshold (which may be any movement at all), user interaction with the menu may be prevented.

At block 660, the location of the vehicle may be continued to be monitored. It may be determined if the vehicle has moved at least a threshold distance away from a location mapped to the location-specific menu. If not, the location-specific menu may continue to be presented. If the vehicle has moved more than the threshold distance away from the location mapped to the location specific menu, the location-menu may cease being presented at block 670.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A location-based in-vehicle restaurant menu system, comprising:
   a digital radio tuner;
   a location sensor that determines a global location of a vehicle;
   an in-vehicle display, wherein the in-vehicle display is incorporated as part of the vehicle;
   a non-transitory processor-readable storage medium; and
   one or more processors that are in communication with the in-vehicle display and the location sensor, wherein the one or more processors are configured to:
      tune the digital radio tuner to a predefined frequency to receive a digital radio transmission;
      receive a plurality of location-specific menus via the digital radio transmission;
      cause the plurality of location-specific menus to be stored to the non-transitory processor-readable storage medium;
      determine a location of the vehicle, based on data received from the location sensor, corresponds to an available restaurant location;
      retrieve a location-specific menu for the available restaurant location from the stored plurality of location-specific menus in response to determining the location of the vehicle corresponds to the available restaurant location; and output for presentation to the in-vehicle display the location-specific menu.

2. The location-based in-vehicle restaurant menu system of claim 1, wherein the one or more processors are further configured to:
receive input selecting a menu application, wherein the location of the vehicle is determined in response to the received input selecting the menu application.

3. The location-based in-vehicle restaurant menu system of claim 1, wherein the one or more processors being configured to determine the location of the vehicle corresponds to the available restaurant location comprises the one or more processors being configured to:
determine the location of the vehicle is within a predefined threshold distance of the available restaurant location.

4. The location-based in-vehicle restaurant menu system of claim 3, wherein the one or more processors are further configured to:
while outputting for presentation the location-specific menu:
determine the location of the vehicle has moved outside of a second predefined threshold distance of the available restaurant location; and
cease to output for presentation the location-specific menu via the in-vehicle display in response to determining the location of the vehicle has moved outside of the second predefined threshold distance of the available restaurant location.

5. The location-based in-vehicle restaurant menu system of claim 1, further comprising an antenna, wherein the one or more processors are further configured to receive data for the location-specific menu via the digital radio transmission received via the antenna.

6. A non-transitory processor-readable medium for providing a location-based in-vehicle restaurant menu comprising processor-readable instructions configured to cause one or more processors to:
tune a digital radio tuner to a predefined frequency to receive a digital radio transmission;
receive a plurality of location-specific menus via the digital radio transmission;
cause the plurality of location-specific menus to be stored to a non-transitory processor-readable storage medium;
determine a location of the vehicle;
determine the location of the vehicle corresponds to an available restaurant location;
retrieve a location-specific menu from the plurality of location-specific menus for the available restaurant location in response to determining the location of the vehicle corresponds to the available restaurant location; and
output the location-specific menu for presentation using an in-vehicle display.

7. The non-transitory processor-readable medium of claim 6 wherein the processor-readable instructions are further configured to cause the one or more processors to:
while outputting for presentation the location-specific menu:
determine the location of the vehicle has moved outside of a second predefined threshold distance of the available restaurant location; and
cease to output for presentation the location-specific menu via the in-vehicle display in response to determining the location of the vehicle has moved outside of the second predefined threshold distance of the available restaurant location.

8. The non-transitory processor-readable medium of claim 6 wherein the processor-readable instructions are further configured to cause the one or more processors to:
receive data for the location-specific menu via a digital radio transmission received via an antenna.

9. A method for providing a location-based in-vehicle restaurant menu, the method comprising:
tuning a digital radio tuner to a predefined frequency to receive a digital radio transmission;
receiving, via the digital radio tuner, a plurality of location-specific menus via the digital radio transmission;
causing the plurality of location-specific menus to be stored to a non-transitory processor-readable storage medium;
determining, using a location sensor, a location of a vehicle in which the location sensor is installed;
determining, by an in-vehicle restaurant menu system, the location of the vehicle corresponds to an available restaurant location;
retrieving, by the in-vehicle restaurant menu system, a location-specific menu for the available restaurant location from the stored plurality of location-specific menus in response to determining the location of the vehicle corresponds to the available restaurant location; and
outputting, by the in-vehicle restaurant menu system, the location-specific menu for presentation using an in-vehicle display.

10. The method for providing the location-based in-vehicle restaurant menu of claim 9, further comprising:
receiving, by the in-vehicle restaurant menu system, input selecting a menu application, wherein the location of the vehicle is determined in response to the received input selecting the menu application.

11. The method for providing the location-based in-vehicle restaurant menu of claim 9, wherein determining the location of the vehicle corresponds to the available restaurant location comprises:
determining the location of the vehicle is within a predefined threshold distance of the available restaurant location.

12. The method for providing the location-based in-vehicle restaurant menu of claim 9, further comprising:
while outputting for presentation the location-specific menu:
determining the location of the vehicle has moved outside of a second predefined threshold distance of the available restaurant location; and
ceasing to output for presentation the location-specific menu via the in-vehicle display in response to determining the location of the vehicle has moved outside of the second predefined threshold distance of the available restaurant location.

13. The method for providing the location-based in-vehicle restaurant menu of claim 9, further comprising receiving data for the location-specific menu via a digital radio transmission received via an antenna.

* * * * *